United States Patent
Mehr et al.

(10) Patent No.: US 10,496,840 B1
(45) Date of Patent: Dec. 3, 2019

(54) RECOMMENDING SECURITY CONTROLS FOR SIMILAR DATA

(71) Applicant: Amazon Technologies, Inc., Reno, NV (US)

(72) Inventors: Nima Sharifi Mehr, Vancouver (CA); William Frederick Hingle Kruse, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 854 days.

(21) Appl. No.: 15/087,350

(22) Filed: Mar. 31, 2016

(51) Int. Cl.
*G06F 16/00* (2019.01)
*G06F 21/62* (2013.01)
*G06F 21/60* (2013.01)
*G06F 16/21* (2019.01)
*G06F 16/34* (2019.01)

(52) U.S. Cl.
CPC ........ *G06F 21/6218* (2013.01); *G06F 16/214* (2019.01); *G06F 16/345* (2019.01); *G06F 21/602* (2013.01)

(58) Field of Classification Search
CPC ..................................................... G06F 16/214
USPC ........................................................ 707/781
See application file for complete search history.

(56) References Cited

U.S. PATENT DOCUMENTS 9,838,384 B1 * 12/2017 Kane-Parry ........... H04L 63/083
2015/0288722 A1 * 10/2015 Sweet ................. H04L 63/0428
726/1

* cited by examiner

*Primary Examiner* — Chelcie L Daye
(74) *Attorney, Agent, or Firm* — Hogan Lovells US LLP (57) ABSTRACT

Security controls applied to a set of data, such as a data volume, can be recommended based on comparing the contents of the data set against those of other data sets and locating other data sets with the same or similar data. Security controls applied to those other data sets, but not applied to the set of interest, can be recommended for application to the data set. In order to protect customer data, the data to be compared can be sampled from the data set and analyzed for aspects such as present patterns, structures, or data types. In some embodiments various derivations can be generated, as may include hashes, checksums, or summaries based on the underlying data, and these derivations can be compared for purposes of finding data sets including similar data. Security controls can be recommended for tasks such as data placement, storage, or migration.

20 Claims, 7 Drawing Sheets

RECOMMENDING SECURITY CONTROLS FOR SIMILAR DATA

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. In many instances, a customer will request that one or more security controls be applied to the storage of customer data by the determined type of resource. When the data is moved between different types of resources, it can be difficult for the customer to understand or ensure that similar security controls are applied for the different types of resources. Further, a customer might not specify or request the appropriate security controls, and it can be difficult for the provider to know which controls would be appropriate without analyzing the customer data, which the customer might not approve due to privacy concerns. While some providers offer security suggestions, these suggestions are often based on best practices and are agnostic of the customers' business use-cases and sensitivity of their data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of data in an electronic environment. In particular, various approaches provide for the recommendation of security controls, or other such security protection mechanisms, to be applied to data stored in a multi-tenant resource environment. In many embodiments a customer can specify which security controls are to be applied to a data volume, data storage instance, or other data set stored in a resource provider environment. If the customer data is moved to a different location, an analysis can be performed to determine whether the same or similar security controls are specified for the new location. If not, the missing controls can be recommended for application to the data stored in the new location.

If customer data is to be written to a location, or is already stored in a particular location, the data can be analyzed and compared to data stored for other customers (or other data for the same customer) to locate instances of the same or similar data. The security controls applied to these instances can be compared against the security controls applied to the customer data set, and any additional or missing security controls can be recommended to the customer. In some embodiments at least some of the controls or functionality can be applied automatically without needing explicit approval from the customer.

In order to protect customer data, the data in a data volume can be sampled and analyzed for specific data aspects, such as data patterns, structures, and types, then the information for these located aspects can be used to locate data volumes storing similar data. In some embodiments a derivation can be generated for the customer data, where the derivation is a value, file, or other data object that is derived from the customer data and can be used for comparison. The derivation can include, for example, a checksum, hash, Bloom filter, or data summary, among others. The derivation can be compared to derivations for other data volumes in order to locate the same or similar data. The security controls applied to the located instances then can be recommended and/or applied to the customer data volume.

Various other such functions can be used as well within the scope of the various embodiments as would be apparent to one of ordinary skill in the art in light of the teachings and suggestions contained herein.

Figure 1:
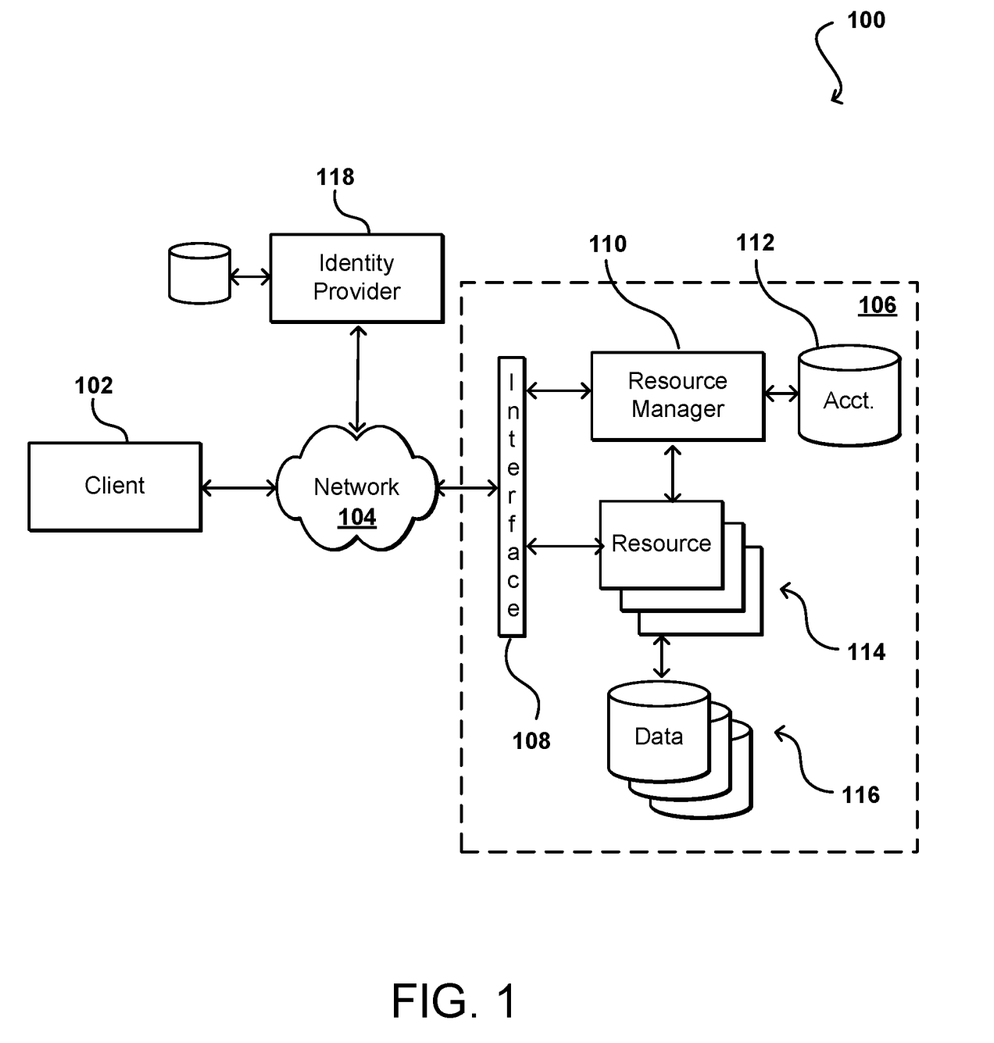
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2A:
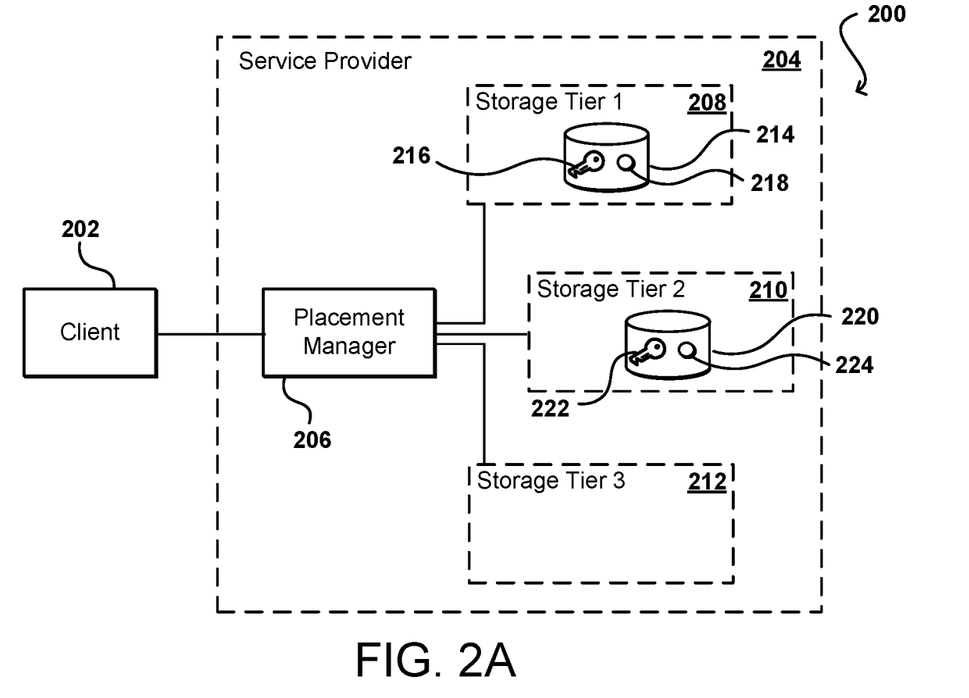
FIGS. 2A and 2B illustrate an example approach wherein data is moved between storage tiers without similar security controls being applied that can be analyzed in accordance with various embodiments.

As mentioned, customer data can be stored in a variety of different types of resources in a resource provider system or other such shared or multi-tenant environment. The different types of resources can include different storage systems or storage "tiers," where those tiers can be implemented using different hardware and/or software, in similar or different logical or geographical regions or zones, as part of different system and/or service offerings, and can be configured or optimized for different purposes. Different management approaches can be taken for these tiers, which can be offered as part of the same or different services or offerings, among other such options. As an example, FIG. 2A illustrates an example environment 200 wherein a client device 202 can send a request to a service provider environment 204 to have data stored in the environment on behalf of a customer. In this example, the request (or information for the request) is received to a placement manger 206, or other such system, service, process, or component, which is able to analyze information for the request and determine where to store the data. This can include, for example, determining an appropriate type of storage for the data based on aspects of the data, the customer, or the request, among other such options. The determination can also include analyzing the available types of capacity in the system and determining the most appropriate location for the data. In some embodiments the placement of data can include provisioning a storage volume on one or more of the software tiers in the system, where the volume in some embodiments can be spread across tiers or have redundant and/or slave copies on the same or different tiers.

In the example illustrated in FIG. 2A, two instances 214, 220 of customer data are stored in the service provider environment 204. The placement manager 206 has placed a first instance 214 in a first storage tier 208 and a second instance 220 in a second storage tier 210. As mentioned, this can include redundant copies or master and slave volumes, for example, as well as portions of a single data volume, among other such options. The storage tiers in this example can include different storage services or storage offerings in different zones or geographic locations, among other such options. As illustrated, the data instances each have a pair of security controls 216, 218 and 222, 224, respectively, applied. These security controls can have been specified by the customer, for example, and applied by the relevant security components or services of the provider environment. These security controls can designate various security aspects of the data, such as may include access control and usage control, among other such options. Examples of security controls that can be applied include controls providing fine-grained access control, encryption at rest, encryption in transit, multi-factor authentication (MFA), audit logging, data monitoring, and data alarming, among other such controls.

In this example, there is a third storage tier 212 within the service provider environment 204. As mentioned, this can include storage in a different location, of a different type, or optimized for a different type of workload or performance, among other such options. In some instances the third storage tier 212 might also have a lower price point, as may be beneficial for workloads where data will be written and then infrequently accessed such that performance is not critical to the customer. For any of these or other such reasons, the customer (or an authorized entity associated with the customer) might decide to have one of the instances, such as the data volume 220 stored in the second storage tier 210, migrated to the third storage tier 212, as illustrated in the example situation 250 of FIG. 2B. In addition to indicating the type of storage and/or tier, the customer can also select or specify the type(s) of security controls to be applied.

Figure 2B:
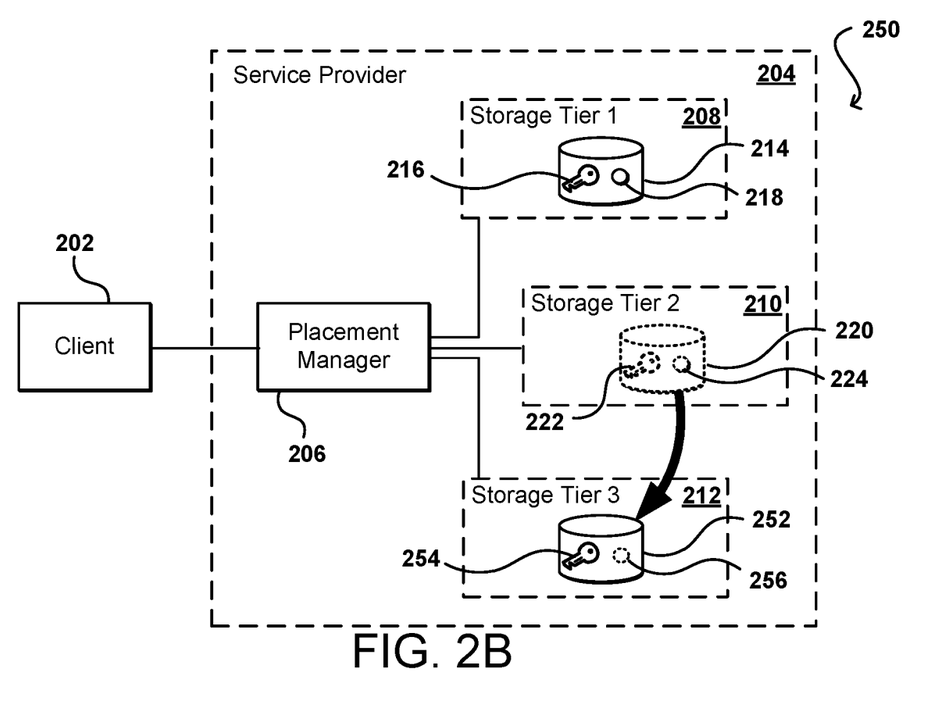

In this example, the customer has selected a specific security control 254 to be applied to data storage in the third storage tier 212. As part of the migration process, such as before or during the migration, the placement manager 206 or another associated component can analyze the security controls 222, 224 that were applied to the same data 220 in the second storage tier 210 to determine whether equivalent security controls are being applied in the third storage tier 212. In this example, since the customer also stores a copy of that data in the first storage tier 208, a check of the security controls 216, 218 applied in the first storage tier can be analyzed as well. The security controls, or at least the functionality of those controls, can be compared to the security control 254 designated by the customer for the third storage tier 212 in order to determine whether the same, or a similar, level of security is being applied to the data in the third storage tier.

In this example the customer has specified a first control 254 that corresponds to similar controls 216, 222 in the other tiers. The customer has not specified a control 256, however, that would correspond to the other controls 218, 224 applied in those tiers. Since control names and functionality can differ between environments, and because it is possible to miss or inadvertently omit specification of certain controls, the customer may have intended to have similar security for the new data volume 252 in the third storage tier 212 but not specified the appropriate controls. Accordingly, the system can determine that the customer has not specified the appropriate control 256 for the third storage tier 212, and can suggest adding the security control for the third storage tier. This can include, for example, sending a notification (e.g., an SMS notification) to the customer or generating a notification through a console or user interface, among other such options. In embodiments where the customer specifies up front to ensure that similar security is provided regardless of the tier, the system can determine the appropriate additional security control 256 and can cause that control to be automatically applied to the data volume 252 in the third tier, among other such options. In the case of an automated security control, the determination and placement can occur before access to the data is provided from the third storage tier. For notifications and recommendations, the notification can occur before, while, or after access is granted within the scope of the various embodiments. In still other embodiments, the security recommendation functionality can be associated with a data pipeline used to transmit data between various storage systems.

In some cases, the customer data being stored to the third storage tier is not the result of a migration operation but instead to the creating of a new data volume and writing of customer data, whether redundant with volumes in the other tiers or not. A potential downside to not performing a migration, however, is that the system might not be able to determine, using a conventional approach, which the data in the new data volume is similar to that in the other storage tiers and, as such, should have similar security controls applied.

Accordingly, approaches in accordance with various embodiments can attempt to compare the data stored (or to be stored) in the new volume with other data stored (or to be stored) for that customer to attempt to determine whether the data for the new data is similar to data for other volumes for that customer. This can include, for example, similar types of data or data structures, among other such options. For example, a determination can be made as to whether the data includes credit card numbers, social security numbers, or other such sensitive data, and then the result can be compared to other similar data to determine whether similar security controls have been applied. The comparison can include determinations as to whether the data is the same as for another customer volume, or includes similar data for which similar controls should be applied.

In at least some cases, however, the customer may not be comfortable or even permitted to allow the provider to analyze the contents of the data. Without the ability to analyze the data, the provider will have difficulty determining whether the data in that volume is similar to the data in another customer volume unless the customer provides that information. Accordingly, approaches in accordance with various embodiments enable portions of the data to be sampled in order to attempt to determine patterns or types of data in a data volume. This can include, for example, reading the data in a specific or random subset of fields and attempting to recognize patterns or types of data useful for comparison.

Still other embodiments can attempt to generate summary, representative, or other derivation data that can be used for the comparison without potentially exposing any of the underlying customer data. This can include, for example, generating hashes or other repeatable representations of some or all of the underlying customer data, and then either determining types or patterns of data from the representations or directly comparing the representations for similarity, among other such options. The hashes can be generated using any of a number of hashing algorithms or cryptographic hash functions known or used for such purposes.

In addition to comparing customer data against other data for the same customer, the ability to generate abstracted representations such as derivations or summaries can enable customer data to be compared against data stored for different customers or entities as well in at least some embodiments. This comparison can be performed for the moving of data between tiers or the storing of new data to a tier, among other such options.

Figure 3A:
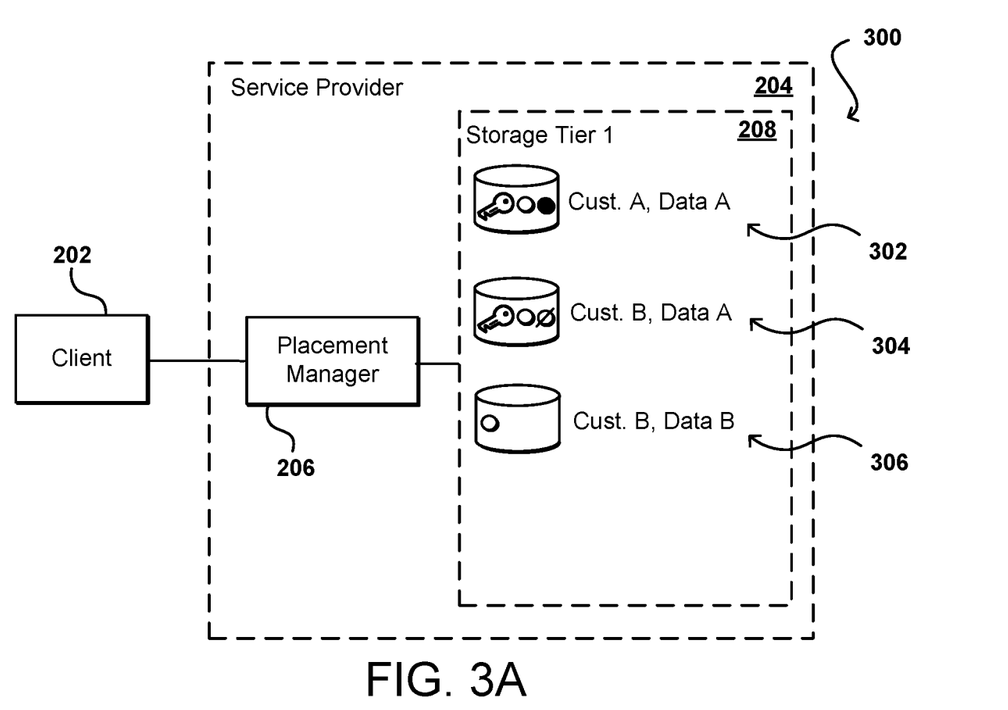
FIGS. 3A and 3B illustrate an example approach wherein a customer causes data to be stored with a first set of security controls, but customers with similar data use additional controls that can be suggested to the customer, which can be analyzed in accordance with various embodiments.

For example, FIG. 3A illustrates an environment 300 wherein the placement manager 206 has placed three data volumes 302, 304, 306 in the first storage tier 208. It should be noted that reference numbers may be carried over between figures for similar elements for ease of explanation, but such usage should not be interpreted as a limitation on the scope of the various embodiments unless otherwise so stated. There are two volumes 302, 304 for the same type of data (Data A) stored by different customers, and a third volume 306 storing a different type of data. For each of these data volumes, a derivation or summary can be generated that can be used to compare these volumes against other data volumes in the same or other storage tiers. In at least some embodiments these derivations can be updated as appropriate, such as once a day or at another appropriate interval.

Figure 3B:
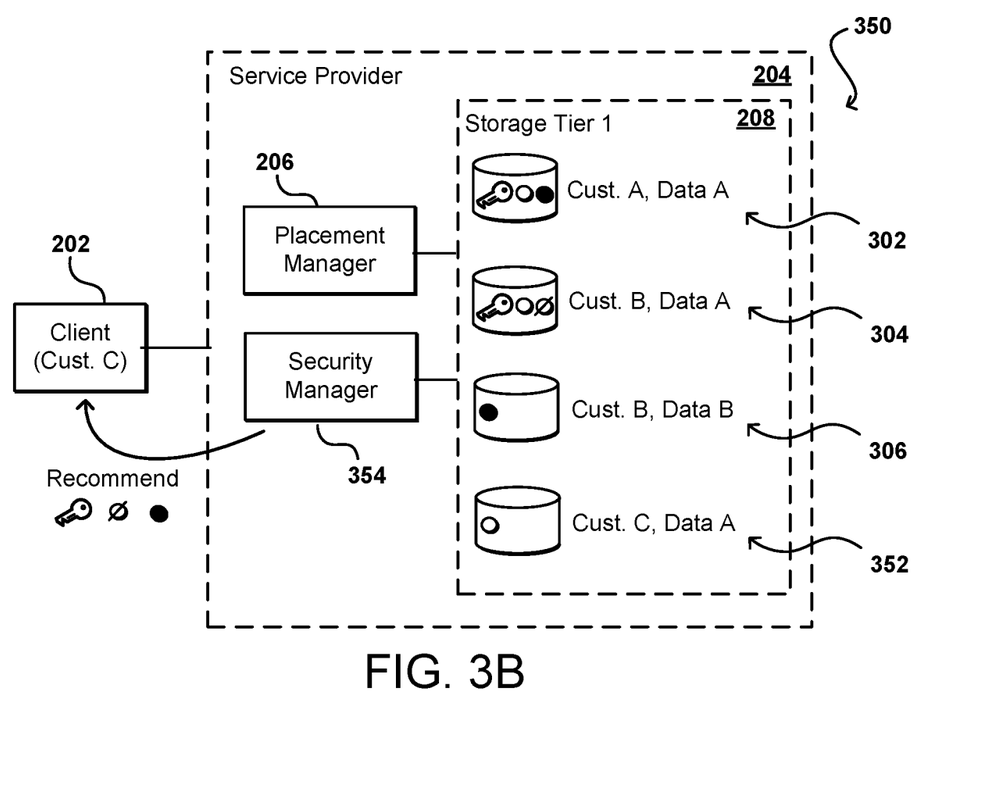

In the example situation 350 of FIG. 3B, a client device 202 has submitted a request to store a new data volume 352 on behalf of a different customer. This data volume will store data of type A, similar to the first two volumes 302, 304 stored for other customers. In many instances, however, the provider will have no way of knowing that the data will be of a similar type. Accordingly, a security manager 354 or other such system or service can analyze the data stored (or to be stored) in the customer volume to generate a summary or derivation for comparison. Sampling and other approaches can be used as well as discussed elsewhere herein. The security manager can compare the derivation against the derivations for other customer volumes and determine that the type of data stored by the new volume 352 is at least substantially similar (i.e., within a minimum amount of certainty or with sufficient confidence) to data stored in other volumes 302, 304 in the service provider environment 204. In other embodiments, the derivation can be used to attempt to classify the data, where the classification can be used to determine the appropriate security controls, among other such options.

In this example, the security manager 354 can determine that the data stored in the new data volume 352 is of substantially the same type as that stored in the first two volumes 302, 304. Accordingly, the security manager 354 can determine which security controls were applied for the volumes 302, 304 storing similar types of data. In this example, both volumes 302, 304 storing similar data have an encryption control that is not applied to the new customer volume 352. Accordingly, this control can be recommended to the customer. Similarly, each volume 302, 304 storing similar data has an additional security control as well. These additional controls can also be recommended for the new volume, and in at least some cases the different control can also be recommended to the corresponding customers for the volumes 302, 304 storing the similar data. The customer might get a ranked list, where the control applied by both volumes is listed first, followed by controls that are only applied by one of the volumes, etc. In some instances the different controls might provide similar functionality, such that the controls may be suggested as alternatives to each other. The customer can select any or all of the security controls to be applied to the new data volume 352. As mentioned, in other embodiments the security manager 354 can be authorized to automatically apply some or all of the recommended security controls, as may be specified by various roles, policies, or permissions applicable for the customer volume.

In some instances where there are alternative controls, a recommendation might be provided to have a different control applied even though the general security or access functionality may be equivalent. For example, it might be the case that an alternative control might provide similar protection but at a lower cost. An alternative control might also provide similar protection or functionality but utilize fewer resources or provide enhanced performance. Various other reasons for suggesting an alternative control can be utilized as well. In some embodiments a set of different controls might be recommended, such as where a set of two newer security controls might provide at least the same security and protection as a set of five older controls currently applied to a data volume or other dataset. As discussed elsewhere herein, a recommendation can also be made to remove a security control from a dataset if, for example, no other users with similar dataset have applied that control, if the control offers redundant functionality with another control, or the control is otherwise determined to likely not be needed for the present dataset, with at least a minimum certainty or confidence in some embodiments.

Figure 4:
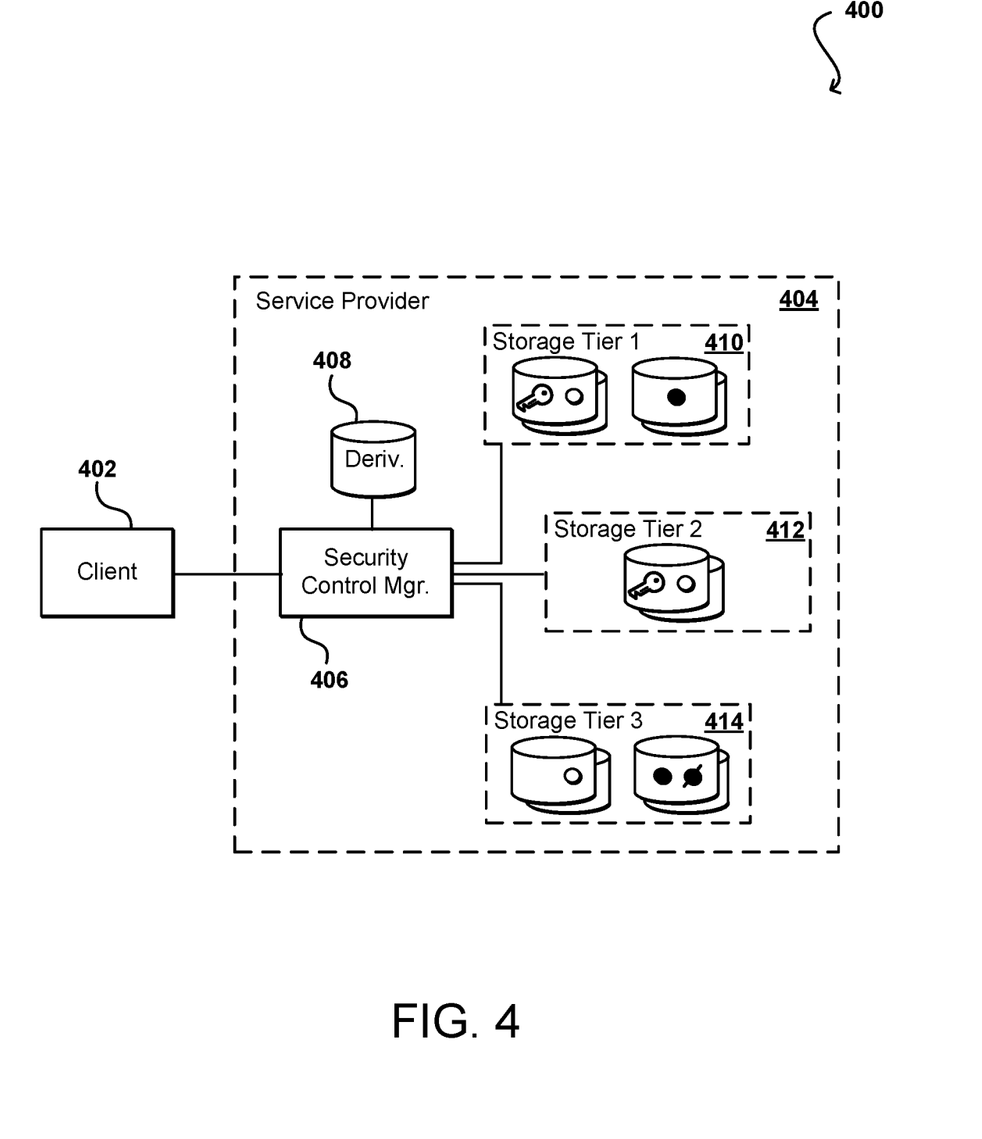
FIG. 4 illustrates an example environment in which a security control manager can scan the instances of customer data stored in the environment and compare derivatives of that data for purposes of suggesting or implementing security controls in accordance with various embodiments.

In some embodiments, as illustrated in the example system 400 of FIG. 4, a set of derivation data can be stored to a central repository 408 or other such location accessible to a security control manager 406, or other such system or service. In this example, there are multiple data volumes stored in each of a set of storage tiers 410, 412, 414, where the tiers can correspond to different storage services or different storage options within a single service, and combinations thereof. The security control manager can periodically (or at other appropriate times) scan the various customer data volumes (as permitted) and generate derivations or summaries of the data stored within those volumes. As mentioned, data sampling can be used to generate summaries in some embodiments.

In some embodiments, the derivation data can be provided by the customers themselves. For example, the customer might opt to receive security recommendations, but may not want the provider to have access to the data (or at least to analyze the data and compare it to data for other customers). In such instances, the provider might provide the customer with the instructions (or tools) for use in generating a derivation or summary to be used for the comparison. For example, if a Bloom filter (or other such probabilistic data structure) is being used then the provider might specify the Bloom filter or appropriate parameters, tokens, or data to be included. If hashes are to be used, the instructions can designate the appropriate credential or algorithm to use to generate the hash. Various other approaches can be used as well within the scope of the various embodiments. The derivation can then be provided by the customer (or a third party, etc.) in order to compare the derivation against derivations for other stored volumes to determine which security controls to apply to the volume. In at least some embodiments this can be performed before any customer data is transferred to the provider environment, in order to ensure that the data is secured appropriately. In other embodiments this can happen after transfer and storage, or at other appropriate time, in order to ensure that the most up to date controls are applied, as well as to suggest new, additional, or alternative controls as the type of data stored changes. If the data is encrypted before being provided to the resource environment for storage, the customer can process the unencrypted data and also provide the derivations along with the encrypted data, enabling comparisons even though the provider never has access to the underlying customer data.

In some embodiments, customer data is sampled by randomly choosing data objects or records for various customer using minimal security controls. This can include, for example, sampling without using encrypted data transfer channels, without whitelisting or MFA, etc. The sampled data then can be used to search for other customers who use more strict security controls and who store or process the same, or substantially similar, sampled data or type of data. The customer can then be provided with a report regarding any missing security controls and/or configuration improvements that might benefit the customer based on the comparison. As an example, customer X might be identified to be storing their data in a table in plain-text, retrieving the data them through an HTTP channel, never rotating the corresponding access credentials, and retaining audit logs for only two weeks. In some embodiments, a limited set of data records can be selected from the customer's table, and tables for other customers (i.e., from the same organization as customer X) can be searched for data matching the sampled data. Various embodiments attempt to identify other customers who are storing and/or processing the same sampled data, or data with similar format and/or syntax, but who are applying stricter security controls. These can include, for example, controls for encrypted records, only using HTTPS channels, rotating access credentials every 30 days, or archiving audit logs archived for a year, among other such options. If such customers are identified, customer X can be prompted about the added security controls that other customers (i.e. from the same organization) are using to protect the same or similar data, or types of data. This can include data with similar structure (i.e., that of social security numbers or drivers' license numbers), specific formats, encryption, etc. In some cases the process can look for the exact data, such as the same file or object. In such cases, a hash or other such value can be generated that can be used for direct comparison. For instance, a cryptographic checksum based on MD5 or SHA-256 can be generated on an object, container, or file basis, and then compared against similar checksums to locate matches with sufficiently high confidence. Within a container, for example, structured data such as XML data can enable checksums to be generated for specific fields or values, or even specific lines. The values and/or the data itself can be stored and used for comparison. In some embodiments the data in an object can be broken down and used to generate representative tokens, where data sets can be compared based upon the number and density of tokens, among other such aspects. As mentioned, in some embodiments the tokens can be used as input to a Bloom filter, with the result being compared for equivalence.

In some embodiments the actual or intended use of the data may be considered as well. For example, data that will be frequently accessed and processed by multiple end users may be treated differently from data that will be infrequently accessed only by the customer, even though the types of data stored might be substantially similar. Similarly, certain industries might be subject to certain regulations that are not present for other industries, which can affect the security controls to be applied. This information can be provided by the customer, specified by the customer account, or otherwise obtained and used to recommend security controls. In some embodiments the producers and/or consumers of a dataset can be considered as well, as those types of entities can be indicative of the types of data being stored. Other factors such as durability, replication, and data locations can be considered as well within the scope of the various embodiments.

Figure 5:
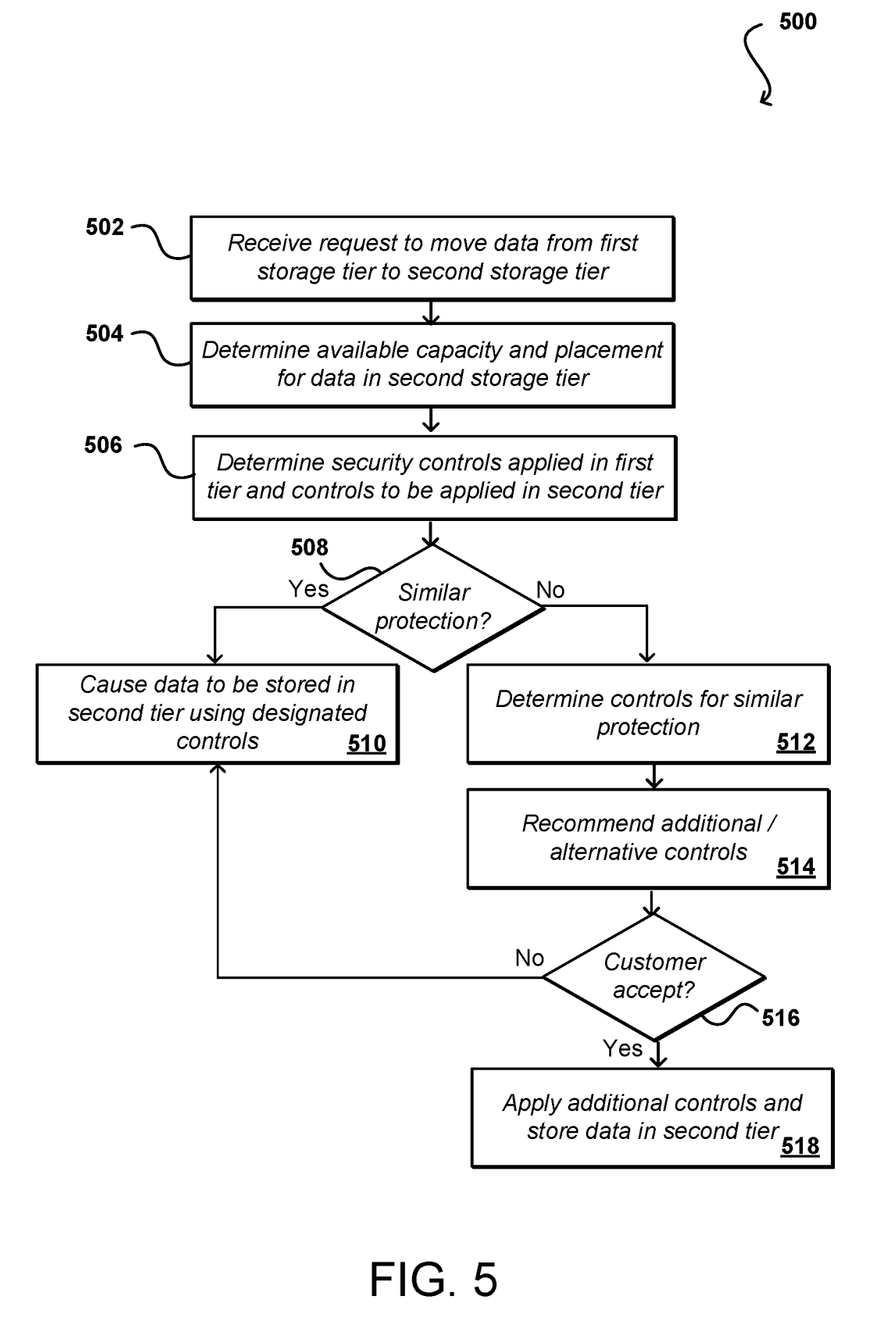
FIG. 5 illustrates an example process for suggesting security controls with the movement of customer data between storage tiers that can be utilized in accordance with various embodiments.

FIG. 5 illustrates an example process 500 for issuing a refresh token with credentials that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request to move or migrate data from a first storage tier to a second storage tier is received 502 on behalf of a customer, where those tiers are offered as part of a resource provider environment. In order to perform the migration, there may be various authorization, authentication, and other such permissions and criteria required by the system as known for such purposes. Further, the types and amount of available capacity for data storage in the resource provider environment can be determined 504, as well as the locations where the data could be placed based at least in part upon that capacity. As mentioned elsewhere herein, certain tiers of storage can be appropriate for certain types of data, such that in some embodiments an attempt can be made to store the data to the optimal available storage. In some embodiments the customer or an application can also specify a storage tier, among other such options.

As part of the migration process, the security controls that are applied to the existing data volume in the current tier, as well as the controls to be applied for the new data volume in the other tier, can be determined 506. In this example, it is desired that the data after migration be at least as secure as before the migration. If the security controls are determined 508 to be the same, or at least to provide similar functionality or offer similar protection, then the data can be caused 510 to be migrated and stored in the other tier with the designated controls being applied. If, however, similar protection is not provided by the control designated for the second tier, then the controls that would need to be applied to provide similar protection can be determined 512. These can be determined based upon mappings between controls or metadata provided with the various controls, among other such options. Once one or more recommended controls are determined, information for those controls can be provided as recommendations 514 for the customer to apply as additional or alternative security controls for the data volume. As mentioned, in some embodiments at least some of the controls can be applied automatically based upon various policies, rules, or permissions, among other such options. If the customer does not accept 516 the recommendations, then the data can be stored to the second tier using the specified controls. As mentioned, there can be various reasons for applying or not applying certain controls, and the customer can be provided with the final decision in various embodiments. If the customer decides to accept one or more of the recommendations, then the additional control(s) can be applied 518 per the customer instructions and the data can be stored in the second tier with the additional or alternative security controls applied.

Figure 6:
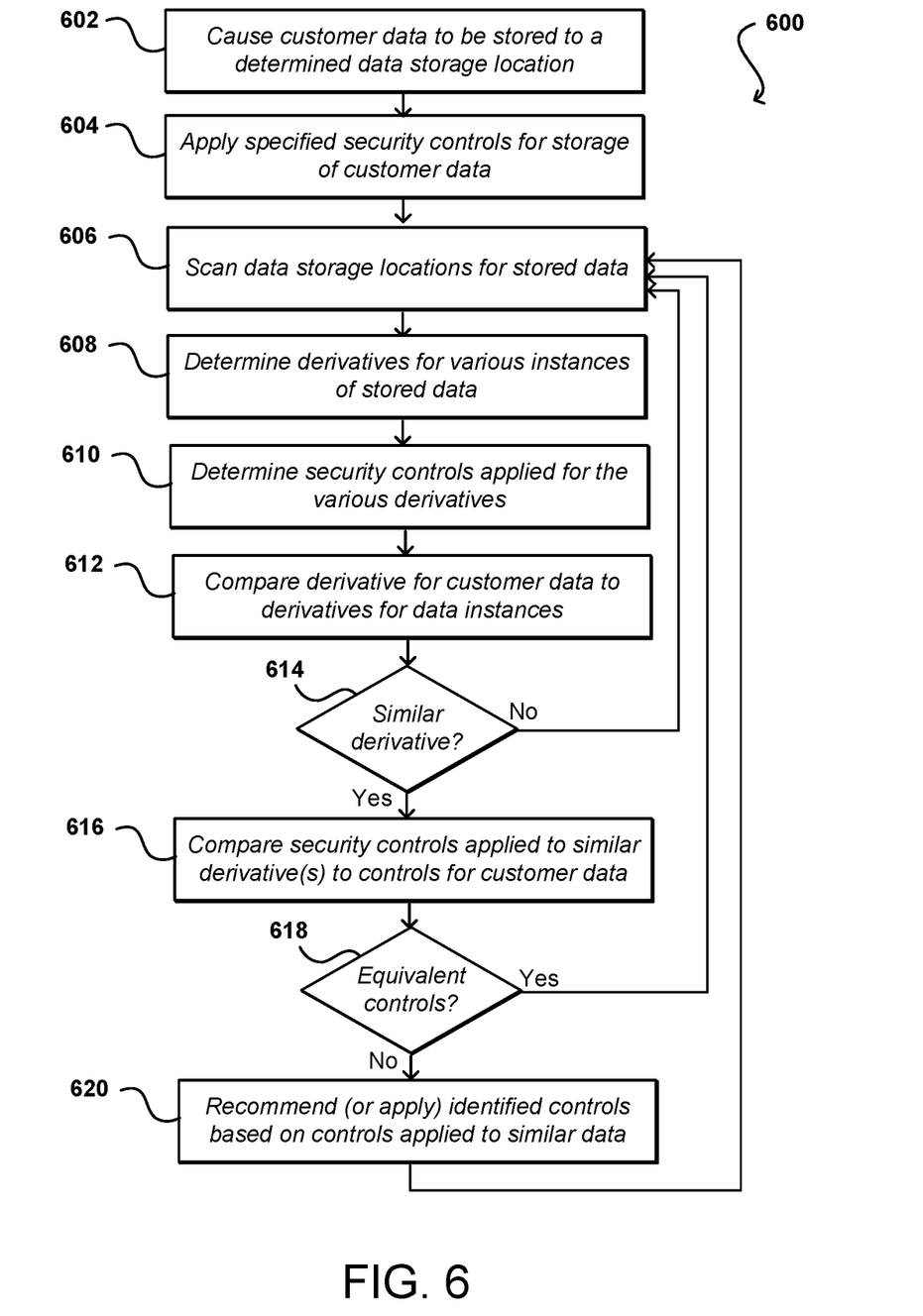
FIG. 6 illustrates an example process for suggesting security controls based on controls applied to the storage of similar data for other customers that can be utilized in accordance with various embodiments.

FIG. 6 illustrates another example process 600 for recommending security controls that can be utilized in accordance with various embodiments. In this example customer data is caused 602 to be stored to a determined data storage location. This can be a result of a migration, a new data volume request, or another such operation. One or more specified security controls (or even none in some instances) can be applied 604 to the data, there the controls can be specified by the customer or another authorized entity. The security controls then can be used to manage access and usage of the data, among other such aspects.

A system or service such as a security manager can scan 606 the data storage locations, such as the data volumes stored across various storage tiers, to determine the locations of data stored for various customers. The scans can be performed at any appropriate time for any appropriate reason, such as part of a periodic scan process, in response to the creation of a new data volume, in response to the addition of a new security control, in response to changes in the security controls applied to any of the data, etc. For at least some of those volumes or other instances of stored data, a derivative can be determined 608 that is representative of that data instance. As mentioned, this can include a sampling, hash, checksum, or other such value or derivative that can be used to compare data or types of data. The security controls applied to those instances can also be determined 610. The derivative for the customer volume can be compared 612 against the derivatives for the various customer instances to attempt to determine whether similar data, or types of data, are stored elsewhere across the environment. In some embodiments, once a data volume is determined to contain similar data to another data volume, or dataset, those volumes can be linked or otherwise associated such that derivatives for those volumes do not need to be recomputed and compared in subsequent scans or processes, at least until such time as a change occurs with respect to one of the data volumes. This can be implemented using, for example, a table or mapping that can be stored with the derivative data or in another appropriate location within the scope of the various embodiments.

If no similar derivatives are located 614, the data volume can continue to be utilized with the current security controls applied. If, however, one or more matching derivatives is located that indicates the same or similar data, or data type(s), with a sufficient level of confidence, then the security controls applied to the matching data instance(s) can be compared 616 against the security controls currently applied to the customer data instance. If it is determined 618 that the customer instance has the same, similar, or equivalent controls, applied, then the data volume can continue to operate with the current controls applied. As mentioned elsewhere herein, "equivalent" controls can refer not only to functionality and/or types of protection, but also to cost and/or performance, among other such options. If the customer data volume lacks any of the security controls applied to one or more matching instances with similar data, or data types, or if alternative controls would provide cost, performance, or other such benefits, then the determined control(s) can be recommended 620 for application. This can include, for example, sending a notification or providing a recommendation through a data storage console. In some embodiments at least some of the additional security controls can be automatically applied, as discussed and suggested elsewhere herein.

Various other approaches or tools can be used to determine similarity between data sets as well. For example a Jaccard similarity approach can be used where the terms in a dataset or document are determined and the overlap of those terms with the terms in another dataset or document can be used to determine similarity, as may be based on a percentage of overlap or other such metric. In a k-shingles-based approach, all terms having at least k characters in length (where k can be any selected number such as 5 or 7) can be determined, and those terms can be cropped to the first k characters (or the prefixes of k characters selected). The resulting terms can be used for matching between datasets in order to prevent having to match all terms in the datasets. Since the number of prefixes can still be significant in some embodiments, these "shingles sets" can be hashed in a k-shingle hashes approach in order to generate buckets for comparison between datasets. In a minhashing approach, a dataset can be characterized by a number of different characteristics, and a matrix can be generated that correlates datasets with specific characteristics. A permutation on those characteristics can then be used as the defining characteristic for comparison. Various other approaches such as may be based upon Hamming distance or other such metrics can be used as well within the scope of the various embodiments.

Figure 7:
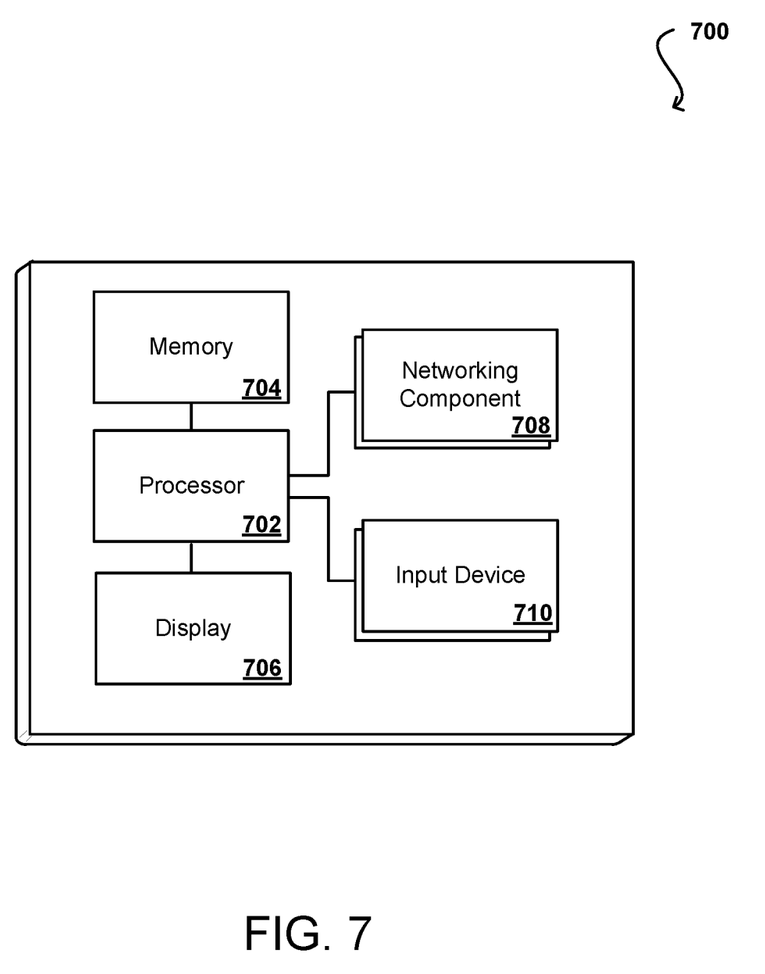
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
  storing a user data volume to a storage resource of a plurality of storage resources in a multi-tenant computing environment, the user data volume associated with a user having an account with a provider of the multi-tenant computing environment;
  applying one or more specified security controls to the user data volume, the one or more specified security controls specified by the user;
  analyzing at least a subset of user data stored in the user data volume to determine at least one characteristic of the user data, the at least one characteristic including at least one of a pattern, a structure, or a type of one or more fields of data in the user data volume;
  generating a first summary for the user data volume based at least in part upon the at least one characteristic;
  comparing the first summary against volume summaries for each of a plurality of other data volumes stored by the plurality of storage resources to locate at least one other data volume storing data having at least one shared characteristic with the data stored by the user data volume;

determining a set of security protection mechanisms applied to the at least one other data volume;

determining at least one identified security protection mechanism that is applied to the at least one located data volume but not applied to the user data volume; and generating a recommendation to cause the at least one identified security protection mechanism to be applied to the user data volume.

2. The computer-implemented method of claim 1, further comprising:

generating at least one of a cryptographic hash, a checksum, or a Bloom filter object using the subset of the user data to be included in the first summary for the user data volume.

3. The computer-implemented method of claim 1, wherein the set of security protection mechanisms include a security protection mechanism specifying at least one of a type of access control, a type of encryption for stored data, a type of encryption for data in transit, a type of communication channel, whether to use multi-factor authentication, or whether to use audit logging.

4. The computer-implemented method of claim 1, wherein the plurality of storage resources are allocated across a plurality of storage tiers in the multi-tenant computing environment, each storage tier including storage resources of a specified type, in a specified location, and having a specified configuration.

5. A computer-implemented method, comprising:

analyzing a first data set received in a computing resource environment;

determining at least one first security control associated with the first data set;

analyzing at least a subset of data in the first data set to generate a first derivative of the first data set, the first derivative indicating at least one of specific data or characteristics of data contained in the first data set;

comparing the first derivative against additional derivatives generated for other data sets stored in the computing resource environment to identify at least one other data set storing data corresponding to the specific data or having the characteristics;

determining at least one second security control applied to the at least one other data set but not applied to the first data set; and generating a recommendation to cause the at least one second security control to be applied to the first data set.

6. The computer-implemented method of claim 5, further comprising:

automatically implementing a third security control, determined to be applied to another data set corresponding to the specific data or having the characteristics, the third security control satisfying at least one automatic implementation criteria for the first data set.

7. The computer-implemented method of claim 5, further comprising:

receiving a request to migrate the first data set from a first storage tier to a second storage tier in the computing resource environment, the first data set and at least one other data set being associated with a user and storing similar data, wherein the recommendation relates to a security control specified by the user to be applied in the first data tier but not specified to be applied in the second storage tier.

8. The computer-implemented method of claim 5, further comprising:

receiving a request to store the first data set to a specified storage tier in the computing resource environment, the first data set associated with a first user, and wherein the other data sets are data sets stored for other users in at least one of the specified storage tier or a different storage tier in the computing resource environment.

9. The computer-implemented method of claim 5, further comprising:

comparing current first derivatives for the first data set against the additional derivatives in order to recommend additional security controls applicable to current states of the first data set.

10. The computer-implemented method of claim 5, wherein the characteristics of the data include at least one of a type of data, a data structure, or a pattern of data.

11. The computer-implemented method of claim 5, wherein the first derivative includes at least one of a cryptographic hash, a random sampling, a checksum, a shingling set, a minhash signature, a Jaccard similarity, a Jaccard distance, or a Bloom filter object.

12. The computer-implemented method of claim 5, wherein the at least one second security control includes a security control specifying at least one of a type of access control, a type of encryption for stored data, a type of encryption for data in transit, a type of communication channel, whether to use multi-factor authentication, or whether to use audit logging.

13. The computer-implemented method of claim 5, wherein the other data sets are allocated across a plurality of storage tiers in the multi-tenant computing environment, each storage tier including storage resources of a specified type, in a specified location, and having a specified configuration.

14. The computer-implemented method of claim 5, further comprising:

determining first parties including at least one of consumers or producers for the first data set; and comparing the first parties against second parties determined for the other data sets to further identify the at least one other data set.

15. The computer-implemented method of claim 5, further comprising:

receiving a specified derivative of the additional derivatives generated for the other data sets from a respective user associated with the specified derivative.

16. The computer-implemented method of claim 15, wherein the other data set corresponding to the specified derivative includes encrypted data that is encrypted before being provided by the respective user, the specified derivative generated using an unencrypted form of the data.

17. A system, comprising:

at least one processor; and memory including instructions that, when executed by the at least one processor, cause the system to:

analyze a first data set received in a computing resource environment;

determine at least one first security control associated with the first data set;

analyze at least a subset of data in the first data set to generate a first derivative of the first data set, the first derivative indicating at least one of specific data or characteristics of data contained in the first data set;

compare the first derivative against additional derivatives generated for other data sets stored in the computing resource environment to identify at least one other data set storing data corresponding to the specific data or having the characteristics;

determine at least one second security control applied to the at least one other data set but not applied to the first data set; and generate a recommendation to cause the at least one second security control applied to the first data set.

18. The system of claim 17, wherein the instructions when executed further cause the system to:

receive a request to store the first data set to a specified storage tier in the computing resource environment, the first data set associated with a first customer, and wherein the other data sets are data sets stored for at least one of the first customer or other customers in at least one of the specified storage tier or a different storage tier in the computing resource environment.

19. The system of claim 17, wherein the instructions when executed further cause the system to:

compare current first derivatives for the first data set against the additional derivatives in order to recommend additional security controls applicable to a current state of the first data set.

20. The system of claim 17, wherein the characteristics of the data include at least one of a type of data, a data structure, or a pattern of data, and wherein the first derivative includes at least one of a cryptographic hash, a random sampling, a checksum, a shingling set, a minhash signature, a Jaccard similarity, a Jaccard distance, or a Bloom filter object.

* * * * *

UNITED STATES PATENT AND TRADEMARK OFFICE
CERTIFICATE OF CORRECTION

PATENT NO.         : 10,496,840 B1
APPLICATION NO.    : 15/087350
DATED              : December 3, 2019
INVENTOR(S)        : Nima Sharifi Mehr et al.

Page 1 of 1

It is certified that error appears in the above-identified patent and that said Letters Patent is hereby corrected as shown below:

On the Title Page

Item (12):
Replace "Mehr" with "Sharifi Mehr"

Signed and Sealed this
Seventh Day of January, 2020

Andrei Iancu
*Director of the United States Patent and Trademark Office*